Patented Jan. 25, 1938

2,106,522

UNITED STATES PATENT OFFICE 2,106,522

TRIETHANOLAMINE RESIN

Carleton Ellis, Montclair, N. J., assignor to Ellis-Foster Company, a corporation of New Jersey No Drawing. Application December 31, 1934, Serial No. 760,046

22 Claims. (Cl. 260—8)

This invention relates to resins formed by condensing a polybasic acid with a polyhydric compound of the triethanolamine type. Compounds of the type of triethanolamine comprehend those substances formed by the reaction of ammonia or a primary amine with an olefin oxide or its derivatives, such bodies being hereinafter referred to simply as triethanolamine.

This is a continuation in part based on my copending application Serial 226,826, filed October 17, 1927.

I have discovered that triethanolamine and phthalic anhydride react on heating to form a resin which polymerizes to an infusible state at a relatively low temperature. However, a mixture containing 40 parts triethanolamine, 60 parts phthalic anhydride and 3 parts urea can be heated to 240° C. and held at this temperature for 15 minutes without the formation of any infusible polymers. Urea acts as a reaction modifier to prevent formation of infusible substances during the period of desired reaction necessary to secure a well-reacted product suitable for use in varnishes, lacquers and other coating compositions.

The present application deals with resins made from triethanolamine and a polycarboxylic acid together with drying or non-drying oils and/or the acids obtained from such oils by hydrolysis.

An object of this invention is to provide siccative compositions comprising a drying oil acid, triethanolamine type of compound and a polybasic acid.

A further object of the invention is to provide compositions, siccative or non-siccative, which are miscible with rubber in solution or in the dry state, comprising the reaction product of a polybasic acid, a monobasic acid and triethanolamine.

In general resins made from triethanolamine and a polybasic acid such as phthalic anhydride, malic acid, maleic anhydride, sebacic acid, or succinic acid, are somewhat dark in color unless the temperature is kept low during the reaction. By modifying this type of resin, replacing part of the dibasic acid with a monobasic fatty oil acid, I have obtained resins which are hard, but yet retain the original color of the starting materials. As described in my parent application 226,826, other polybasic acids such as citric, tartaric, fumaric and the like acids may be used in place of, or in addition to the acids named.

Commercial triethanolamine contains the tertiary amine as the principal constituent, but it also contains some of the secondary amine (diethanolamine) and a small proportion of the primary amine (monoethanolamine). Triethanolamine differs from other polyhydric alcohols in that as well as being an alcohol it is a base. When triethanolamine is mixed with a monobasic fatty acid (or any acid) the following reaction takes place:

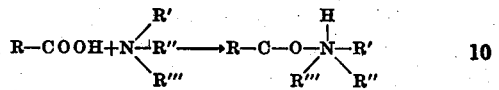

In a triethanolamine type compound of the nature here contemplated, at least two of the radicals, R', R'', R''' contain hydroxyl groups and the product is a polyhydric alcohol which may be further resinified with a polybasic acid. For instance, if RCOOH denotes linoleic acid and

denotes triethanolamine, then the initial compound formed by the above reaction is triethanolamine linoleate. The difference in this case when resinification is effected with, say, phthalic anhydride, is that the drying, or fatty oil, acid constituent is directly combined to nitrogen. If three constituents, for instance, phthalic anhydride, linoleic acid and triethanolamine, are heated together, a complex product is obtained. Some acid radicals are united with nitrogen; others with carbon. Thus, there is an essential difference between modified polyhydric alcohol-polybasic acid resins made from non-aminic alcohols and the type comprehended by triethanolamine.

One object of the invention is to provide resinous compositions made from a triethanolamine soap and a polybasic acid.

I have found that resins made according to this invention are miscible in all proportions with rubber in a hydrocarbon solution; such solutions drying to films which are clear. A suggested use for these nitrogen-containing resins is as antioxidants for rubber. Besides being combined with rubber in solution, they may be incorporated by milling or grinding.

These resins are also miscible with nitrocellulose in solution and compatible in a dry film. Since they are, or can be made, predominantly basic, they serve as stabilizers for nitrocellulose.

Resins which are very different in chemical character from the ordinary modified polybasic acid, polyhydric alcohol resins may be made by replacing the triethanolamine partly with some other polyhydric alcohol such as glycerol, glycol, pentaerythritol, mannitol, etc. Complexes which do not chemically resemble the ordinary alkyd resins are thus obtained.

Within this category are included various sensitized oils, that is, oils treated so as to be capable of incorporation in an unmodified alkyd resin. For instance, when a fatty oil is heated with a polyhydric alcohol, redistribution of the fatty oil acid takes place giving a mixture of mono-, di- and tri-esters which may be resinified with triethanolamine and a polybasic acid. Also, when a polybasic acid is heated with a fatty oil, the oil is partly hydrolyzed to give the free fatty acid and a part-ester of the glyceride oil and the polybasic acid. Such a sensitized oil may be further reacted with triethanolamine to give a resinous product. Also, fatty oils can be sensitized by heating with triethanolamine. In this case several reactions may occur, such as formation of an amine soap, or an ester of the alkylolamine and the fatty acids which split off, or formation of mixed soap-esters. Any of these or their mixtures may then be further resinified by heating with a polybasic acid.

In general the resins from a polybasic acid, a monobasic acid and triethanolamine are soluble in drying oils. In this way they may be compounded into varnishes and used as coating compositions.

When triethanolamine is heated with a drying oil acid, a compound is formed which in itself may be used as a varnish base. When dissolved in suitable solvents such as V. M. & P. naphtha, solvent naphtha, or turpentine and about 2.5 per cent lead-cobalt drier solution added, a fast-drying, light-colored varnish is produced. I prefer to heat about 2.5 to 4 moles of drying oil acid with 1 mole of triethanolamine. By continued heating of this mixture gradual thickening and polymerization takes place. The final products range from light, mobile oils to firm, sticky solids or gels. If, for instance, 3 moles of tung oil fatty acids are heated with 1 mole of triethanolamine, an oil is produced which dries quickly without frosting or wrinkling. Such a compound is readily compatible with rubber, both in hydrocarbon solution and in a dry film.

The following are several examples given to further illustrate the methods of preparing the resins described hereinabove:

Example 1

| | Parts by weight |
|---|---|
| Commercial triethanolamine | 20 |
| Phthalic anhydride | 25 |
| Linseed oil fatty acids | 10 |

These constituents are mixed and heated slowly up to 200° C. Bubbling and foaming starts at about 170° C. At 200° C. the mixture thickens rather rapidly. At first the mixture is cloudy, but soon clears and remains clear when a test sample is cooled to room temperature. Heating is continued at 200°–215° C. for about 20 minutes. The reaction mixture is allowed to increase in viscosity until almost a gel and is then rapidly cooled to room temperature. The product is light-colored, sticky and has slightly rubbery characteristics. It is readily soluble in toluol.

A varnish may be made from such a composition as above described by dissolving it in toluol, or a mixture of toluol and V. M. & P. naphtha, to the desired consistency, then adding lead-cobalt driers.

Example 2

| | Parts |
|---|---|
| Triethanolamine | 20 |
| Phthalic anhydride | 25 |
| Tung oil fatty acids | 10 |

The constituents are mixed and heated slowly up to 200° C. Bubbling and forming commence at about 170° C. The tung oil fatty acids react very readily into the phthalic-amine resin. In about 2 minutes at 200° C., the resin becomes clear and remains clear on cooling a test sample to room temperature. The mixture is light in color and does not darken appreciably during the heating. The resin has a tendency to gel rapidly. It thickens in about 10 minutes of heating at 200° C. to an almost infusible stage. However, before this change set in, the mixture may be cooled rapidly to room temperature, in which case the final material is light-colored, brittle yet sticky, and slightly rubbery. It is readily soluble in toluol and miscible with rubber.

A varnish film from this resin containing driers dries in about 4 hours.

Example 3

| | Parts |
|---|---|
| Commercial triethanolamine | 20 |
| Phthalic anhydride | 20 |
| Linseed oil fatty acids | 40 |

These materials are heated together to 200°–210° C. for about 10 minutes, then at 230° C. for ½ hour, during which time the mixture increases in viscosity. At this stage the mixture is clear on cooling to room temperature. Heating is continued for about 15 minutes longer at 230° C., but during this further heating does not increase noticeably in viscosity. At room temperature the material is a light-colored, soft, sticky resin. It is readily soluble in toluol and in a mixture of toluol and mineral spirits.

Example 4

| | Parts |
|---|---|
| Triethanolamine | 20 |
| Phthalic anhydride | 20 |
| Tung oil fatty acids | 40 |

These constituents are heated together at 210° C. for about 5 minutes, then at 230° C. for 10 minutes. The tung oil fatty acids combine very readily into the phthalic-amine complex. Continued heating at 230° C. shows a tendency for the mixture to gel. The product is, therefore, cooled to room temperature before gelling occurs. It is a very soft, sticky solid, light in color and readily soluble in toluol and a toluol-mineral spirits mixture.

Varnishes made from this material dry dust-free in from 1¾ to 2½ hours and are hard in from 3¼ to 4¼ hours.

Example 5

| | Parts |
|---|---|
| Product from Example 4 | 2 |
| Raw tung oil | 1 |

These materials are mixed and heated to 240° C. for 5 minutes. The consistency of the product is that of a very viscous liquid. It is very readily soluble in V. M. & P. naphtha.

Varnishes made from the above mixture dry dust-free in from 1¾ to 2¾ hours and dry in from 2¾ to 3¼ hours.

The materials in all of the above examples, with the exception of Example 5, are suitable for incorporation in rubber, both in solution and by milling.

Example 6

| | Parts |
|---|---|
| Tung oil fatty acids | 7 |
| Triethanolamine | 1 |

These two constituents are heated to 210° C. for about 15 minutes, then to 250° C. for about ½ hour. At the end of this time the product no longer solidifies, but remains liquid. It has a consistency of a very viscous oil at room temperature.

10 g. of the above product are dissolved in 12 g. of V. M. & P. naphtha and 0.25 g. of a 33.3% solution of lead-cobalt naphthenate drier solution in V. M. & P. naphtha is added. A film of this varnish dries dust-free in 1½ hours and is dry in 3 to 4 hours.

If the above product is dissolved in toluol it may be mixed with a toluol solution of gum rubber in any proportion. Such solutions dry to give perfectly clear films.

Example 7

| | Parts |
|---|---|
| Commercial triethanolamine | 15 |
| Phthalic anhydride | 15 |
| Raw tung oil | 15 |
| Rosin (W. W.) | 30 |

These constituents are heated together to 200°–210° C. while mechanical stirring is carried on to mix the reactants completely. Within a few minutes slight darkening takes place and the mixture becomes clear. In about 15 minutes of heating at 210° C. a small drop of the mixture when cooled to room temperature remains clear. When the material has attained a consistency such that at room temperature it is a somewhat soft, but brittle solid, heating is stopped.

The final product is readily soluble in toluol, benzol, xylol, a mixture of these solvents with alcohol and a mixture of these solvents with V. M. & P. naphtha.

When about 1 per cent drier based on the resin is added a quick-drying varnish is produced. A film when dry is practically water-white.

Example 8

| | Part by weight |
|---|---|
| Resin of Example 7 | 1 |
| Raw tung oil | 1 |

These are heated to 240° C. for 5 minutes. The resin is very readily soluble in the tung oil and dissolves immediately as the resin becomes molten. Another method is to dissolve the two constituents in a solvent and mix the solutions.

When made into a varnish containing about 3 per cent lead-cobalt naphthenate drier solution based on the resin, a film dries dust-free in about 1 hour and is entirely dry in 3 to 4 hours.

Included under the term "triethanolamine type" are various other amines of more or less corresponding nature, such as those of propyl alcohol and other alcohol derivatives.

As pointed out in my application Serial No. 226,826, my invention is concerned with products derived from an organic acid or a plurality of such acids. These acids include such polybasic acids as succinic, citric, malic, maleic, fumaric, phthalic, tartaric, adipic, azelaic, suberic, etc. Also such fatty acids as those derived from the animal and vegetable oils including lauric, myristic, palmitic, stearic, oleic, linoleic, linolenic, etc.

What I claim is:

1. A resin comprising the reaction product of phthalic anhydride, triethanolamine and a drying oil fatty acid.

2. A synthetic resin including the reaction product of triethanolamine with an organic carboxylic acid.

3. A synthetic resin consisting of the reaction product of triethanolamine with an organic carboxylic acid.

4. A synthetic resin including the reaction product of triethanolamine with phthalic anhydride.

5. A synthetic resin including the reaction product of triethanolamine with phthalic anhydride, and an aliphatic carboxylic acid.

6. A synthetic resin including the reaction product of triethanolamine with a polybasic organic carboxylic acid.

7. A synthetic resin consisting of the reaction products of polyhydric alcohols including triethanolamine with an organic carboxylic acid.

8. A synthetic resin consisting of the reaction products of polyhydric alcohols including triethanolamine with a polybasic organic carboxylic acid.

9. A synthetic resin consisting of the reaction products of polyhydric alcohols including triethanolamine with phthalic anhydride.

10. A synthetic resin consisting of the reaction products of polyhydric alcohols including triethanolamine with phthalic anhydride and an aliphatic carboxylic acid.

11. A synthetic resin consisting of the reaction product of triethanolamine with a polybasic organic carboxylic acid.

12. The method of producing synthetic resins which comprises heating a mixture of triethanolamine with a polybasic organic carboxylic acid.

13. The method of producing synthetic resins which comprises heating a mixture of triethanolamine with phthalic anhydride.

14. The method of producing synthetic resins which comprises heating a mixture of triethanolamine with phthalic anhydride and an aliphatic carboxylic acid.

15. The method of producing synthetic resins which comprises heating a mixture of triethanolamine with a mixture of organic carboxylic acids including a polybasic acid.

16. A synthetic resin including the reaction products of triethanolamine with phthalic anhydride and an organic carboxylic acid.

17. A synthetic resin consisting of the reaction products of polyhydric alcohols including triethanolamine with phthalic anhydride and an organic carboxylic acid.

18. A synthetic resin consisting of the reaction products of triethanolamine with phthalic anhydride and an organic carboxylic acid.

19. The method of producing synthetic resins which comprises heating a mixture of triethanolamine with an organic carboxylic acid.

20. The method of producing synthetic resins which comprises heating a mixture of polyhydric alcohols, including triethanolamine with an organic carboxylic acid.

21. A synthetic resin consisting of the reaction product of triethanolamine and one or more acids from the group consisting of phthalic anhydride, oleic, citric, tataric, maleic, malic and fumaric acids.

22. The method of producing synthetic resins which comprises heating a mixture of triethanolamine and one or more of the acids of the group consisting of phthalic anhydride, oleic, citric, tartaric, maleic, malic and fumaric acids.

CARLETON ELLIS.